Figure 1:
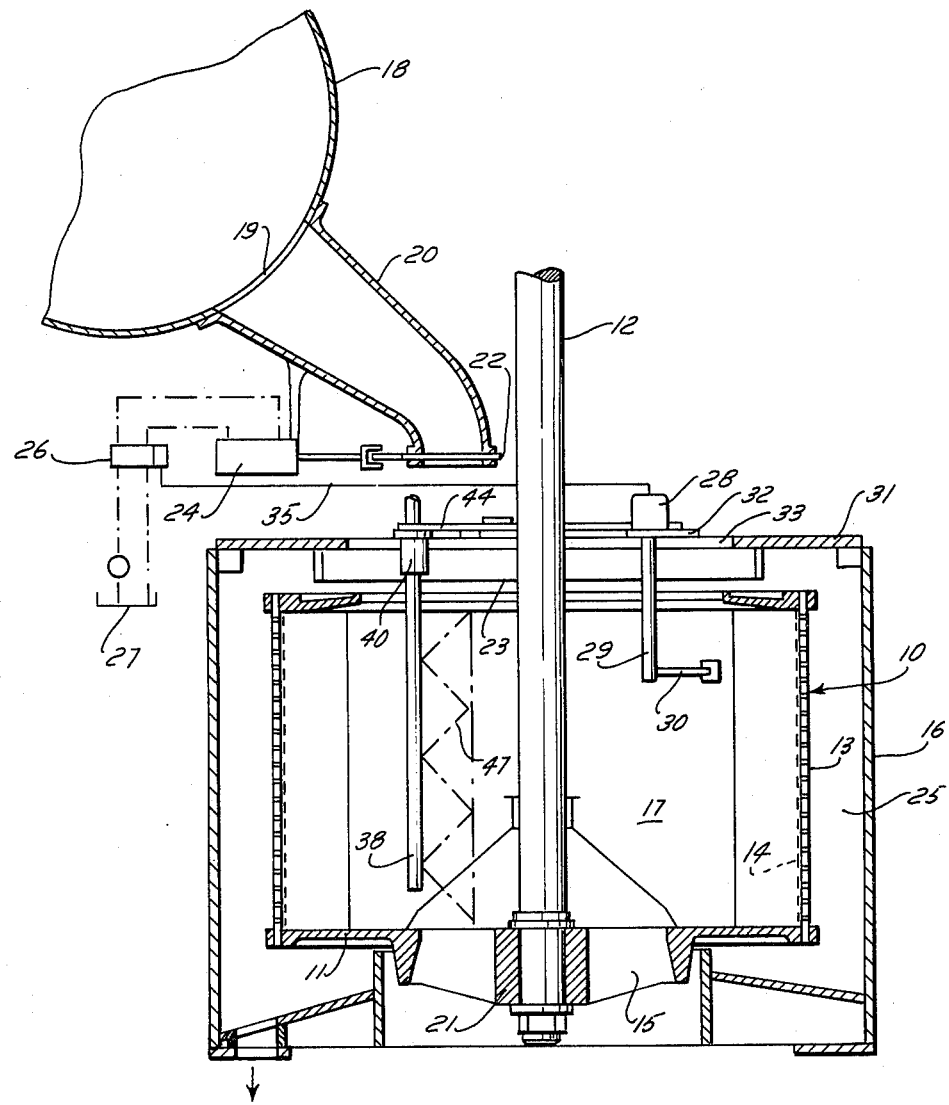

United States Patent [19]

Delfosse

[11] 4,297,210
[45] Oct. 27, 1981

[54] CENTRIFUGAL SEPARATOR

[75] Inventor: Claude Delfosse, Hellemes, France

[73] Assignee: Fives-Cail Babcock, Paris, France

[21] Appl. No.: 173,961

[22] Filed: Jul. 31, 1980

[51] Int. Cl.³ .................. B01D 33/02; B01D 33/34
[52] U.S. Cl. .................................. 210/107; 210/111; 210/372
[58] Field of Search ............... 210/86, 100, 107, 111, 210/372, 373

[56] References Cited

U.S. PATENT DOCUMENTS

| | | | |
|---|---|---|---|
| 2,271,493 | 1/1942 | Brewer | 210/100 |
| 2,727,630 | 12/1955 | Hertrich | 210/100 |
| 3,141,846 | 7/1964 | Laven, Jr. | 210/86 X |
| 3,446,431 | 5/1969 | Marchal et al. | 210/86 X |
| 3,712,471 | 1/1973 | Muller | 210/107 |
| 4,229,298 | 10/1980 | Bange | 210/86 X |

FOREIGN PATENT DOCUMENTS 486795  1/1976  U.S.S.R. ........................ 210/111

Primary Examiner—Robert H. Spitzer
Attorney, Agent, or Firm—Kurt Kelman

[57] ABSTRACT

A centrifugal separator has a rotary cylindrical basket on which a cake of solids builds up during rotation of the basket. The charge of the basket is controlled by a sensor sensing the thickness of the cake and a vertical manifold sprays a wash fluid on the cake. The washing of the cake is improved by mounting the manifold on a mobile support and linking this support to the sensor so that the position of the manifold is a function of the thickness of the cake.

5 Claims, 3 Drawing Figures

CENTRIFUGAL SEPARATOR

The present invention relates to an apparatus for the centrifugal separation of solids from a liquid, which comprises a cylindrical basket having a perforate side wall defining an interior chamber, the basket being mounted for rotation about a vertical axis, and means for charging a solids-liquid mixture into the interior chamber of the basket, rotation of the basket causing a cake of the solids to be built up on the side wall while the liquid is centrifugally removed therethrough.

The drying of solids-liquid mixtures in such separators is effected in repetitive cycles during which the mixture is charged into the basket chamber. A control for the charging means interrupts further feeding of the mixture, i.e. it terminates a drying cycle, when the thickness of the cake built up on the side wall of the basket has reached a predetermined parameter. After a first drying cycle, the cake is washed by a fluid delivered from a vertically extending manifold positioned in the interior basket chamber. This manifold may have a vertical row of orifices or of fluid atomizing nozzles delivering the fluid. After the cake has been washed and dried, it is discharged from the basket.

To produce effective washing, the position of the manifold, or rather its orifices or nozzles, must be adjusted as a function of the thickness of the cake to be dried on the side wall of the basket. If the jets of wash fluid projected from the manifold against the cake of solids are spaced from each other as they impinge upon the cake, bands of poorly washed product will remain in the cake and the dried product will not have the desired quality. On the other hand, if the jets of wash fluid overlap on the cake, furrows will be formed in the cake in the zones of overlap because of the excess of wash fluid and, eventually, the cakes will be excessively rehumidified.

In known centrifugal driers, the operator monitoring the operation must adjust the position of the manifold each time the charging conditions are changed, i.e. the thickness of the cake in the basket changes. In addition, the nature of the product to be dried must be taken into account for this adjustment since, for any given initial thickness of the cake, the thickness of the dried product will be more or less in direct proportion to the content of solids in the product. These adjustments are cumbersome and, therefore, sometimes ignored, which leads to the poor drying results indicated hereinabove.

It is the primary object of this invention to overcome this disadvantage and to provide uniform washing of the entire cake, regardless of the thickness thereof or of the solids content in the product to be dried. In effect, this object is obtained by making the position of the wash fluid manifold a function of the position of the sensing element of the charging control.

According to the invention, the control for the charging means includes a sensing element for sensing the thickness of the cake built up on the side wall, a vertically extending manifold delivering a wash fluid adjustably positioned in the interior chamber of the basket, a mobile support for the manifold, movement of the support causing the position of the manifold to be adjusted, and means movably connecting the mobile support to the control, preferably a support for the sensing element thereof, whereby the position of the manifold is a function of the thickness of the cake sensed by the sensing element.

Figure 2:
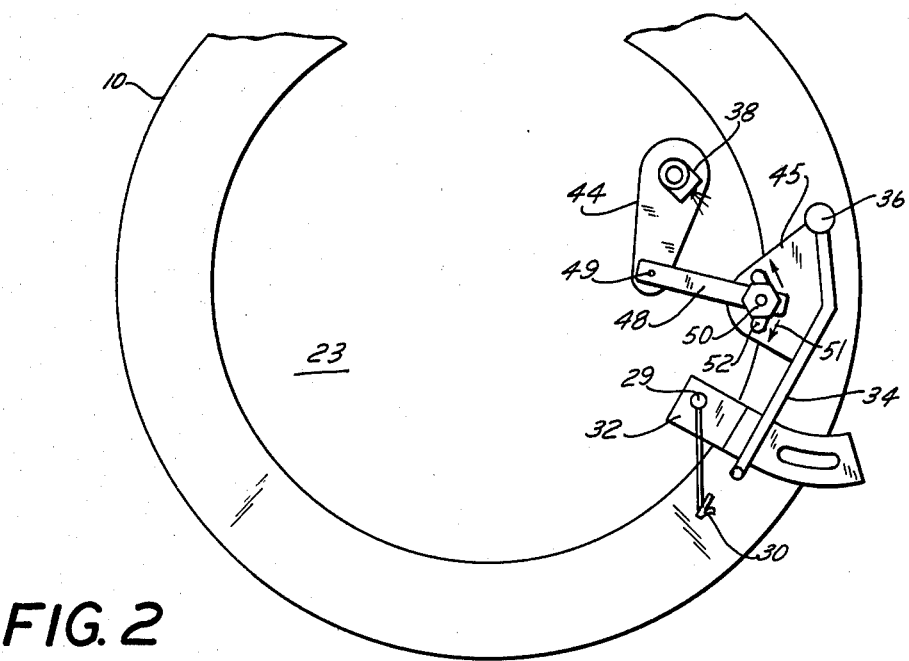
Figure 3:
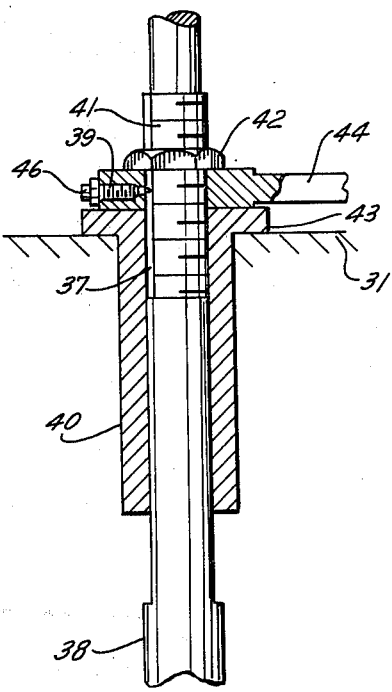

The above and other objects, advantages and features of the present invention will become more apparent from the following detailed description of a now preferred embodiment thereof, taken in conjunction with the accompanying schematic drawing showing only those components of the apparatus essential to this invention and wherein FIG. 1 is a vertical section taken in an axial plane and showing the preferred embodiment;

FIG. 2 is a fragmentary top view of the basket, the manifold and the control of the apparatus of FIG. 1; and FIG. 3 is an enlarged fragmentary side elevational view of the manifold and its support.

Referring now to the drawing, there is shown a generally conventional apparatus for the centrifugal separation of solids from a liquid, i.e. a centrifugal drier, which comprises cylindrical basket 10 having perforated side wall 13 defining interior chamber 17. The side wall of the basket is lined by screen 14. The basket is mounted for rotation about a vertical axis, for which purpose hub 21 of bottom 11 of basket 10 is keyed to an end of vertical shaft 12. An opposite end of the shaft is suspended from a support (not shown) and coupled to a drive motor (not shown) for rotating the shaft.

An annular discharge opening 15 is defined in the basket bottom for removing dried material from the basket and an upper end wall of the basket defines opening 23 through which rotary shaft 12 projects and through which interior basket chamber 17 is charged. Basket 10 is mounted in stationary housing 16 surrounding the basket and defining therewith annular chamber 25 which receives the liquid centrifugally removed from interior basket chamber 17 through perforate side wall 13. At the end of the drying process, the cake of solids built up on screen 14 is detached therefrom by a blade (not shown) and removed through opening 15.

A solids-liquid mixture to be dried is charged into interior basket chamber 17 and rotation of the basket by shaft 12 causes the cake to be built up on the side wall of the basket while the liquid is centrifugally removed therethrough. The illustrated charging means includes mixer 18 to whose outlet opening 19 is attached conduit 20 having an outlet closable by sliding gate 22. Opening and closing of gate 22 are controlled by pressure fluid operated jack 24 whose cylinder chambers are connected, as shown in dash-dotted lines indicating the pressure fluid circuit of the control, to solenoid valve 26. As indicated schematically, one of the valve chambers receives a constant amount of pressure fluid from sump 27 and excess amounts of pressure fluid are returned thereto through a return line. This valve chamber is connected to the cylinder chambers of jack 24. The valve is connected to control 28 for the charging means. The control energizes solenoid valve 26 when the cake built up on side wall 13 of basket 10 has reached a predetermined thickness to operate jack 24 and close gate 22.

As shown, housing 16 has cover 31 defining inlet opening 33 in registry with opening 23, the solids-liquid mixture passing from conduit 20 through openings 33 and 23 into interior basket chamber 17 when gate 22 is open.

Control 28 includes sensing element 30 for sensing the thickness of the cake built up on the side wall during a drying cycle. The illustrated sensing element is a finger carrying a flat sensing member at one end and being affixed at the opposite end thereof to rotary shaft 29 mounted on support 32 for the sensing element. Support 32 has arm 34 and pivot 36 mounts an end of arm 34 on cover 31 of housing 16 for displacement of support 32 about a vertical axis. Rotary shaft 29 and affixed sensing element 30 is movable with respect to support 32 between an active and a rest position. When the position of the sensing element is moved from the one to the other position, a switch in transmission line 35 from control 28 to solenoid valve 26 is opened or closed for de-energizing or energizing the solenoid valve. Before the basket is charged, the sensing element is moved into the active position and its position in interior basket chamber 17 is adjusted by displacing support 32, i.e. by pivoting support arm 34. This adjustment will control at what thickness of the cake charging will be terminated. Suitable stop means (not shown) will hold support 32 in the adjusted position on cover 31 of housing 16.

During a drying cycle, a solids-liquid mixture is charged from mixer 18 into basket 10 while the latter is rotated and gate 22 is held open. A cake of the solids builds up on side wall 13 of the basket and its thickness steadily increases until the sensing plate of sensing element 30 contacts the cake. This causes the sensing element to assume its rest position and this, in turn, causes closure of gate 22 through control 28 to terminate the drying cycle.

Vertically extending manifold 38 delivers wash fluid to the cake in interior basket chamber 17 and is adjustably positioned in the interior chamber. The manifold may have a row of calibrated orifices or of atomizing nozzles arranged to spray the cake with jets of the wash fluid. Any desired wash fluid may be delivered through the manifold, such as water, steam or other vapors, a solution of the product to be dried, etc.

As best shown in FIG. 3, manifold pipe 38 is journaled in bearing sleeve 40 affixed by flange 43 to cover 31 of housing 16. The manifold is rotatable in the sleeve about its axis for adjustable positioning of its orifices or nozzles. The manifold pipe has outer threaded end 41 extending through a bore in mobile support arm 44 and nut 42 engages the threaded end of the support arm to mount manifold 38 on mobile support arm 44, the support arm resting on flange 43 of bearing sleeve 40. Movement of the support arm will thus cause the position of the manifold to be adjusted, i.e. this movement will cause rotation of the manifold pipe about its axis and reposition its orifices or nozzles accordingly. Set screw 39 extends through mobile support arm 44 and its inner end is received in longitudinally extending groove 37 in manifold pipe 38 so that the support arm and the manifold are locked together with common movement. Stud 46 at the outer end of the set screw permits rotation thereof so that it may be moved out of engagement with groove 37, thus permitting vertical movement of the manifold in bearing sleeve 40.

According to the invention, means movably so connect mobile support 44 to control 28 that the position of the manifold is a function of the thickness of the cake sensed by sensing element 30 of the control. As shown in FIG. 2, mobile support 44 for manifold 38 is mounted for rotation on a pivot about a vertical axis coincident with the axis of the manifold, and the connecting means includes connecting rod 48 linked to supports 32 and 44 at respective pivots 49 and 50 spaced from the vertical axes defined by the pivot for mobile support 44 and pivot 36 for support arm 34. Thus, pivoting of displaceable support 32 causes pivoting of mobile support 44. As shown, support arm 34 for support 32 has bracket 45 on which pivot 50 is mounted.

The spatial relationships between connecting rod pivots 49 and 50 and the vertical axes about which supports 44 and 32, 34 pivot is such that the manifold delivers the wash fluid for substantially uniform distribution over the entire height of the basket regardless of the thickness of the cake of solids built up on side wall 13 of basket 10. In other words, the distances between the pivot of each support and the pivot linking connecting rod 48 to this support and the length of the connecting rod are so selected that the wash fluid jets are directed uniformly over the entire cake at any thickness thereof, this uniform wash fluid distribution being assured by the controlled orientation of the water jets, as indicated by dash-dotted lines 47 in FIG. 1, showing that the wash fluid jets impinge upon the cake along its entire height without appreciable overlap.

Since the thickness of the cake to be washed depends on the content of solids after a first drying cycle, whatever the initial thickness may have been, means are provided for adjusting the pivot of the connecting rod on one of the supports, i.e. its distance from the pivot of the one support. In the illustrated embodiment, this adjusting means is constituted by arcuate slot 52 in bracket 45 affixed to arm 34 of support 32. Pivot 50 is adjustably mounted in the slot and may be moved therein in the direction of double-headed arrow 51, thus repositioning mobile support 44 for manifold 38 with respect to displaceable support 32 for sensing element 30. Pivot 50 may have a threaded end carrying a nut which may be loosened to enable the pivot to be moved in slot 52 and tightened to fix pivot 50 in the adjusted position.

While the present invention has been described and illustrated in connection with a now preferred embodiment, many variations and modifications may occur to those skilled in the art to substitute equivalent means for those exemplified herein. In particular, various means may be used to link the control and the manifold; the manifold may be radially reciprocated instead of being turned about its axis; the control may be displaced along a path other than circular. The control may also be of a different type than that described and illustrated. In certain cases, the mobile support of the manifold may be linked to the sensing element and not to a displaceable support therefor. All of these and other modifications are within the scope of this invention which is defined by the appended claims.

The centrifugal drier of the invention may be usefully applied to the drying of massecuites in sugar refineries and crystallized chemical products generally.

What is claimed is:

1. An apparatus for the centrifugal separation of solids from a liquid, which comprises
   (a) a cylindrical basket having a perforate side wall defining an interior chamber, the basket being mounted for rotation about a vertical axis,
   (b) means for charging a solids-liquid mixture into the interior chamber of the basket, rotation of the basket causing a cake of the solids to be built up on the side wall while the liquid is centrifugally removed therethrough,
   (c) a control for the charging means, the control including
      (1) a sensing element for sensing the thickness of the cake built up on the side wall,
   (d) a vertically extending manifold delivering a wash fluid adjustably positioned in the interior chamber, (e) a mobile support for the manifold, movement of the support causing the position of the manifold to be adjusted, and (f) means movably connecting the mobile support to the control whereby the position of the manifold is a function of the thickness of the cake sensed by the sensing element of the control.

2. The centrifugal separating apparatus of claim 1, further comprising a support for the sensing element, the mobile support for the manifold being connected to the support for the sensing element.

3. The centrifugal separating apparatus of claim 2, the sensing element including a rotary shaft mounted on the support and the rotary shaft being movable with respect to the support between an active and a rest position, the support for the sensing element being displaceable and the control of the thickness of the cake being effected by displacement of the support.

4. The centrifugal separating apparatus of claim 3, further comprising a pivot mounting the displaceable support for displacement about a vertical axis, another pivot mounting the mobile support for the manifold for rotation about another vertical axis, the manifold and the other pivot being co-axial, and the connecting means including a connecting rod linked to the supports at respective pivots spaced from respective ones of the vertical axes, the spatial relationships between the connecting rod pivots and the vertical axes being such that the manifold delivers the wash fluid for substantially uniform distribution over the entire height of the basket regardless of the thickness of the cake of solids built up on the side wall of the basket.

5. The centrifugal separating apparatus of claim 4, further comprising means for adjusting the pivot of the connecting rod on one of the supports.

* * * * *